(12) United States Patent
Vinoy

(10) Patent No.: US 9,038,670 B2
(45) Date of Patent: May 26, 2015

(54) POLYMER TUBE COMPRISING AN IDENTIFICATION SENSOR, AS ITS MANUFACTURING PROCESS

(71) Applicant: RYB S.A., St. Etienne de St. Geoirs (FR)

(72) Inventor: Bernard Vinoy, St. Etienne de St. Geoirs (FR)

(73) Assignee: RYB S.A., Saint Etienne de St. Geoirs (FR)

( * ) Notice: Subject to any disclaimer, the term of this patent is extended or adjusted under 35 U.S.C. 154(b) by 33 days.

(21) Appl. No.: 13/891,119

(22) Filed: May 9, 2013

(65) Prior Publication Data

US 2013/0263958 A1    Oct. 10, 2013

Related U.S. Application Data

(63) Continuation of application No. PCT/EP2011/005653, filed on Nov. 10, 2011.

(30) Foreign Application Priority Data

Nov. 10, 2010   (EP) .................................... 10290603
Nov. 26, 2010   (EP) .................................... 10368043

(51) Int. Cl.
*F16L 55/00* (2006.01)
*F16L 1/11* (2006.01)
*G01V 15/00* (2006.01)

(52) U.S. Cl.
CPC ............ *F16L 55/00* (2013.01); *Y10T 29/49826* (2015.01); *Y10T 156/10* (2015.01); *F16L 1/11* (2013.01); *G01V 15/00* (2013.01)

(58) Field of Classification Search
CPC ............ G06K 2017/004; G01V 15/00; E21B 47/02224
USPC ............... 138/104, 129, 137, 144; 340/572.1, 340/572.4
See application file for complete search history.

(56) References Cited

U.S. PATENT DOCUMENTS

| | | |
|---|---|---|
| 5,173,139 A | 12/1992 | Rippingale et al. |
| 5,532,598 A | 7/1996 | Clark, Jr. et al. |
| 6,271,667 B1 | 8/2001 | Minarovic |
| 6,478,229 B1 * | 11/2002 | Epstein ........................ 235/492 |
| 6,850,161 B1 * | 2/2005 | Elliott et al. ............... 340/572.1 |
| 7,221,277 B2 * | 5/2007 | Caron et al. ............... 340/572.1 |
| 7,616,119 B2 | 11/2009 | Corbett, Jr. |
| 7,712,674 B1 * | 5/2010 | Warner et al. ................. 235/492 |
| 8,217,783 B2 * | 7/2012 | Mekid et al. ............... 340/539.1 |
| 2005/0012616 A1 * | 1/2005 | Forster et al. ............... 340/572.7 |
| 2008/0204235 A1 * | 8/2008 | Cook ........................ 340/572.1 |

(Continued)

FOREIGN PATENT DOCUMENTS

| | | |
|---|---|---|
| DE | 102008055917 | 5/2010 |
| GB | 2 457 384 | 8/2009 |
| WO | WO 2009/118505 | 10/2009 |

OTHER PUBLICATIONS

"Analysis of the Moebius Loop Magnetic Field Sensor," by Paul H. Duncan, Jr., Sensor and Simulation Notes, Note 183, Sep. 1973, pp. 1-21.

*Primary Examiner* — Patrick F Brinson
(74) *Attorney, Agent, or Firm* — Saile Ackerman LLC; Stephen B. Ackerman

(57) ABSTRACT

A polymer tube for conducting a pipe buried underground, having a plurality of RFID tags arranged at regular intervals along the tube and a protective layer of the RFID tags.

21 Claims, 6 Drawing Sheets

(56) References Cited

U.S. PATENT DOCUMENTS

2009/0301382 A1* 12/2009 Patel ............................ 116/201
2009/0309724 A1* 12/2009 Cecil ............................ 340/552
2011/0025468 A1* 2/2011 Longhurst et al. ........... 340/10.1

* cited by examiner

*Clamping fixing*

*Welding fixing*

*clip fixing*

POLYMER TUBE COMPRISING AN IDENTIFICATION SENSOR, AS ITS MANUFACTURING PROCESS

This application is a continuation of International Application No. PCT/EP2011/005653, filed on Nov. 10, 2011, and herein incorporated by reference in its entirety

TECHNICAL FIELD

The present invention relates to the field of non metallic tubes used for producing buried pipes, and particular a polymer tube fitted with a identification sensor as its manufacturing process.

BACKGROUND ART

Polymer materials (PolyEthylene EP, polypropylene PP, PVC, FRP etc. . . . ) are materials widely used fro the production of underground pipelines, serving for the distribution of water, gaz, electricity, telecommunications.

In this regard, polymers tend to become active competitors to cast iron, which is still the main material used fro the distribution of water.

Despite the numerous benefits shown by polymer materials and particularly polyethylene with respect to cast iron (welded network, auto-stop, flexible, adapting to the movements of the ground, which do not corrode . . . ), there is still an obstacle preventing its generalized use: the positioning after the installation. Indeed, known identification techniques use electromagnetic characteristics of ferrous materials.

The polymers are insensitive and therefore do not allow such identification of the location. Generally speaking, by nature, plastic pipes are inert and difficult to detect once buried within the ground. Only geographic surveys can achieve to situate them. But the urban environment evolves, making difficult any accurate and comprehensive view of the basement. Every year, several thousand of pipelines are accidentally pulled, with potentially significant consequences.

Such is the technical problem to be solved by the present invention.

SUMMARY OF THE INVENTION

It is an object of the present invention to provide a polymer tube which may be buried at a depth of about two meters while still allowing positioning and even more generally communication with a surface communication device.

It is another object of the present invention to provide a polymer pipe fitted with an auto-diagnostic capability, which can be remotely investigated.

It is a third object of the present invention to achieve a polymer pipe which can be detected from the surface after its burial, allowing both positioning and traceability from the surface.

It is another object of the present invention to provide a method of manufacturing such a polymer tube.

The invention achieves these objects by means of a polymer tube for conducting a pipe buried underground, said tube comprising:
  a polymer tube;
  a plurality of RFID tags arranged at regular intervals along the tube;
  a protective layer of said tags Preferably, the polymer tube comprises RFID tags which are placed on a ribbon wrapping around the tube or by methods described in the embodiments described hereinafter.

In one particular embodiment, the RFID tags are arranged on a polymer sheet before welding its ends to the tube.

Alternatively, the radio-tags are arranged on a continuous tape adhered to a generatrix of the tube.

Alternatively, the RFID tags are glued directly after preforming.

In one particular embodiment, the protective layer is made of polypropylene so as to protect the RFID tags during the packaging process of the tube and the diverse operations involved before and during installation.

In one particular embodiment, the tube comprises means for communicating the identity, its manufacturing characteristics, its particulars relevant to the positioning of the tube and some additional information which the operators may wish to incorporate in accordance with the possibilities of data storage.

The invention also relates to a method of manufacturing a tube of polymer which may serve for realizing a pipe buried in the ground, said method comprising the steps:
  providing a polymer tube;
  providing a tape comprising a series of RFID tags, each having a longitudinal axis at an angle $\alpha$ relative to the axis of said tape;
  winding said tape around the polymer tube at an angle equal to said angle $\alpha$ so as to align the longitudinal axes of the RFID tags with the axis of the tube;
  optionally covering with a layer of protection.

The invention also relates to a method of manufacturing a tube of polymer for the production of a pipe buried in the ground, said method comprising the steps of:
  providing a polymer tube;
  providing a polymer sheet comprising, at regular intervals, radio-tags;
  covering the tube with said polymer sheet so as to align the ends;
  welding the ends;
  optionally covering with a layer of protection.

The invention also relates to a method of manufacturing a tube of polymer for the production of a pipe buried in the ground, said method comprising the steps of:
  providing a polymer tube;
  providing a continuous strip having, at regular intervals, RFID tags;
  bonding of the strip;
  optionally covering with a layer of protection.

The invention also relates to a method of method of manufacturing a tube of polymer for the production of a pipe buried in the ground, said method comprising the steps of:
  providing a polymer tube;
  preforming radio-label so that its shape coincides with the radius of curvature of the tube;
  direct gluing on a generatrix of the tube;
  Optionally covering with a layer of protection.

In a particular embodiment, the protective layer is a polymer.

DESCRIPTION OF THE DRAWINGS

Other features of one or more embodiments of the invention will appear from the following description of embodiments of the invention, with reference being made to the accompanying drawings.

DESCRIPTION OF THE PREFERRED EMBODIMENTS

In the following, one will describe one particular embodiment adapted for the realization of a pipe or pipeline intended to be buried underground. One will typically consider the example of a tube HDPE (High Density Polyethylene), suitable for the realization of a pipeline for water supply, for gas distribution, for sanitation, or for protection of electrical cable and optical fiber. One will more particularly consider the illustrative example of a multilayer pipe made of polyethylene for the purpose of realizing a buried pipe under pressure, consisting of a tube of high density polyethylene PE 80 or PE 100 complying with the standard EN1555.

Figure 1:
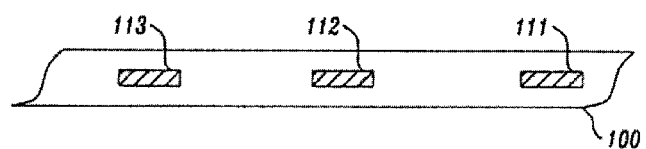
FIG. 1 illustrates one embodiment of a pipe, comprising on its length a set of RFID tags.

In order to achieve detection of the pipeline and, even, its identification together with an exchange of information with the latter, the tube 100 is fitted with a series of markers or RFID (Radio Frequency ID) type tags which are arranged on the tube, located at regular intervals, as this is illustrated in FIG. 1 by reference numbers 111, 112 and 113. These radio-labels or "tags" each comprise a transponder with an antenna associated with an electronic chip capable of transmitting and receiving information with a reader located at the surface.

In general, as this is known to a skilled person, the reader includes an inductive resonant antenna which is usually represented by a series resonant circuit consisting of a resistor r, a capacitor C1 and an inductive element or antenna L1, the circuit being excited by an appropriate RF generator suitable to generate a high frequency carrier modulated (in amplitude and/or phase) to transmit information to the transponder.

The transponder located in the radio-tag on the tube comprises, for its part, a resonant circuit, being either series or parallel, with an inductive element or antenna L2 connected in parallel with a capacitor C2 and a load R representing the electronic circuits of transponder. This resonant circuit senses the high-frequency magnetic field produced by the base station, when it is subjected to this field. In general, the chip incorporates the C2 capacitor comprised in the resonant circuit. The magnetic field is generally sufficient to ensure the power supply of the transponder so that the latter becomes completely independent.

The polymer pipeline becomes capable of communication even when it is buried underground.

In a particular embodiment, in order to allow exchange of information even when the pipe is deeply buried—two meters below the surface—a specific set of RFID tags is used, which are well adapted to the presence of a moist environment, as this will be described hereinafter.

Figure 2:
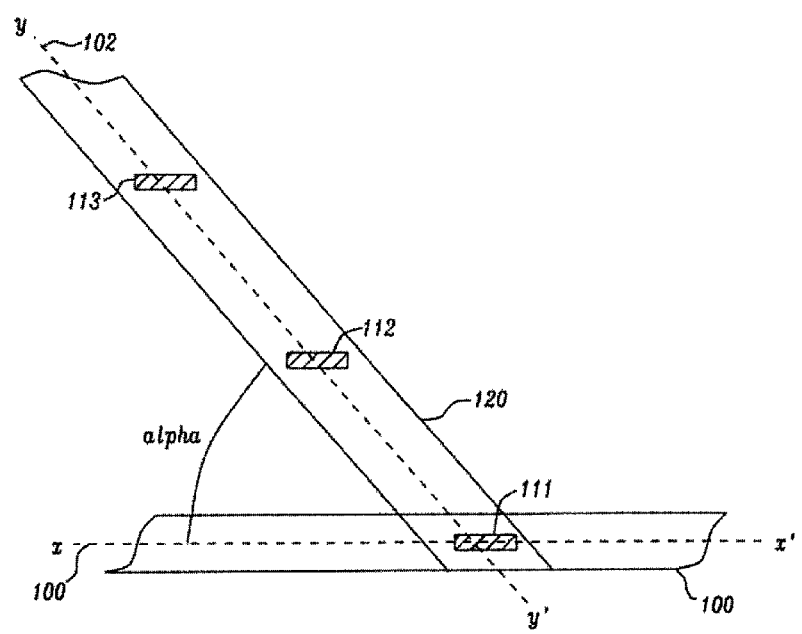
FIG. 2 illustrates a ribbon having an arrangement of RFID antennas oriented with a specific angle $\alpha$ before wrapping on the polymer tube.
Figure 3:
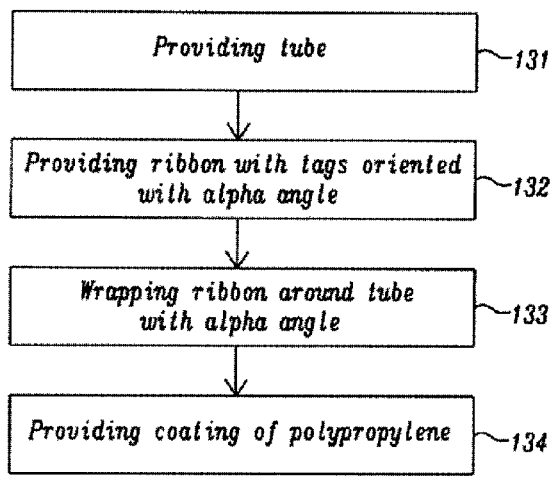
FIG. 3 illustrates a first method of manufacturing a polymer tube having RFID tags located on the ribbon of FIG. 2.

With reference to FIGS. 2 and 3, one will firstly describe a first embodiment of a method of manufacturing a tube capable of communication according to the present invention.

The manufacturing process starts with a first step 131, which involves the provision of a HDPE tube, as represented by the tube 110 of FIG. 3. The tube 10 has an axis x-x' referenced 101.

Then, in a second step 132, there is provided a ribbon 120, for example consisting of polypropylene comprising, at regular intervals, a series of RFID tags 111, 112 and 113.

It should be noted that the longitudinal axis of 111-112-113 tags makes a predetermined angle α with respect to the longitudinal axis of the ribbon, represented by axis y-y' referenced 102.

Practically, the arrangement of the ribbon carrying the RFID tags can be achieved by means of a conventional wrapping device, such as those which are used to pose a coating of aluminum foil. A wrapper is an industrial tool well known to a skilled man, which will not be discussed further;

Then in a step 133, the process comprises the step of winding the ribbon around the tube, as illustrated in FIG. 3, on an axis equal to the axis a mentioned above.

This results in the perfect alignment of the tags 111, 112 and 113 with the x-x axis after the completion of the winding operation.

Being aligned with the axis of the tube, the tags will show an optimal configuration, providing resistance to mechanical effects, such as bending . . . .

Optionally, in a step 134, there is provided a protective layer or coating, such as for example an outer layer of polymer. In a particular embodiment, one provides a layer of polypropylene designed for preventing damage to the antenna of the radio-label.

Figure 4:
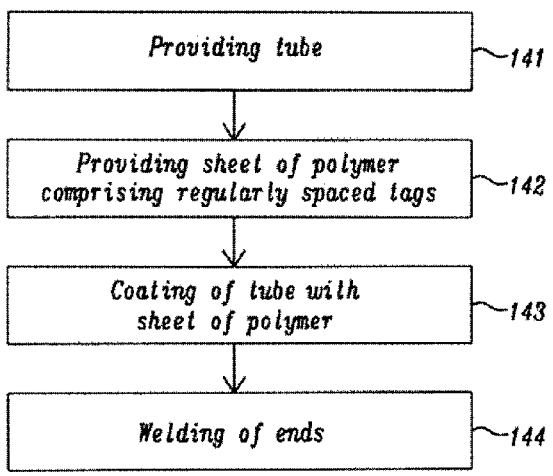
FIGS. 4, 5 and 6 respectively illustrate a second, a third and a fourth embodiment of the manufacturing process.

FIG. 4 illustrates a second embodiment of a tube comprising tags or RFID tags aligned at regular intervals.

The process comprises, in a step 141, the step of providing of a polymer tube, such as a type of polyethylene.

Then, in a step 142, there is provided a polymer film on which are aligned at regular intervals, the radio labels or tags.

Then, in a step 143, the tube is coated with the polymer sheet so that the two ends are joined on a generatrix of the tube.

The sheet is then set on the arrangement.

In general, the skilled man may use the conventional techniques known for achieving the coating of a tube with a sheet of aluminum, especially when the tube is to be buried in a polluted environment or even when the tube is intended for the production of a sanitary installation wherein the layer of aluminum layer achieves dimensional stability during bending.

In the embodiment which is here described, one uses, not a conventional sheet of aluminum, but a sheet of polymer on which a set of regularly aligned radio-labels or tags is arranged.

The second embodiment of the process then completes with a step 144 during which the two ends of the sheets are welded, in particular by means of an ultrasonic technique.

Optionally one may, in a step 145, coat the tube with a protective layer, such as polypropylene.

It will now be described in relation to FIG. 5, a third method of manufacturing a tube capable of communication.

In a step 151, there is provided a polymer tube, for example a polyethylene type tube.

Then, in a step 152, the process comprises the provision of a continuous tape (the width of which being not intended to completely cover the entire periphery of the tube) on which are arranged, spaced at regular intervals, radio-labels or RFID tags.

The process then proceeds with a step 153 which consists in the bonding of the tape along a generatrix of the tube.

Optionally one can, in a step 154, coat the tube with a protective layer, such as polypropylene.

Figure 6:
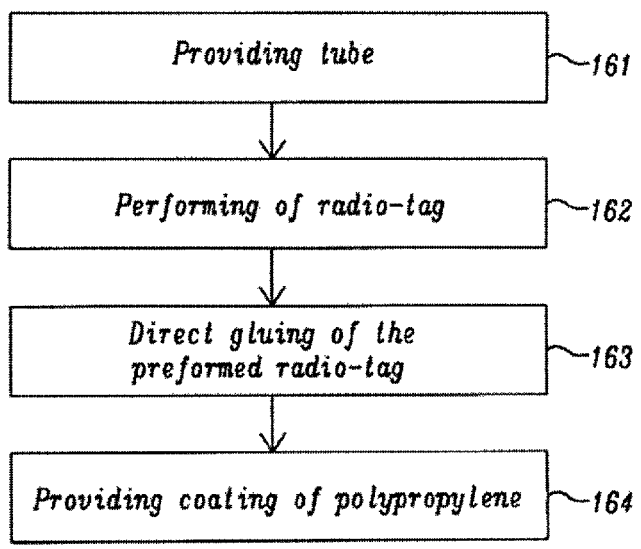

FIG. 6 now illustrates a fourth embodiment of a method of manufacturing a communicating tube according to the present invention.

The process comprises a step 171, wherein a polymer tube such as a polyethylene type tube is provided.

Then, in a step 162, the process proceeds with the optional preforming of a tag or a radio-label in order to match its shape to the radius of curvature of the tube.

Then, in a step 163, the process proceeds with the direct placement on a generatrix of the tube, of radio-label previously preformed in accordance with step 162.

The process then comprises, in a step 164, the optional coating of the radio-label with a layer of protection.

There will now be described with more details one embodiment of a transceiver for a radio-tag which can perfectly and advantageously serve for the realization of a polymer tube to be used for an underground pipeline.

Such transceiver is subject of a French patent application, entitled "antenna for moist environnement", filed on 15 Jun. 2010 by the Applicant « Commissariat à l'Energie Atomique et aux Energies Alternatives (C.E.A) »

One may note that in a moist environment or even saturated in water, the communication between a surface reader and a transponder located on the radio-tag might be significantly reduced.

Indeed, the resonant circuits of the reader and of the transponder are generally tuned to a same resonance frequency $\omega(L1.C1.\omega^2=L2.C2.\omega^2=1)$. When the transponder is placed in an environment such as air, the electric permittivity of the medium surrounding the transponder is practically that of vacuum ($\omega_0=8,854.10^{-12}$ Farad per meter, or relative permittivity $\in_r=1$). The characteristics of the resonant circuit of the transponder (frequency tuning, quality factor) are stable and at their nominal values.

On the contrary, in a moist environment, the presence of water significantly modifies the electric permittivity of the environment surrounding the transponder, up to very high values, several dozens, which is much higher than the permittivity of the air ($\in_r=1$). As a result, stray capacitances formed between different portions of the inductive circuit (L2) of the transponder antenna are strongly increased, thus deeply altering the tuning between the reader and the transponder and thus significantly jeopardizing the quality factor and the quality of the transmission (remote powering and communication).

To make the tuning of the tag insensitive to the moist environment in which it is stuck, there is provided a new arrangement for the inductance of the oscillating circuit present within the transponder. More particularly, one provides an antenna which is split into subassemblies or into pairs of sections interconnected in a specific way to form resonant subassemblies all having the same resonance frequency, each sub-assembly having a sufficiently low inductance value for the capacitive element taking part in the concerned subassembly to have a value sufficient to make stray capacitances depending on the moist environment permittivity negligible, even with a high permittivity.

By reducing the value of the inductance of each of the resonant subassembly, one increases the capacitive value of the resonant circuit which, consequently, becomes less sensitive to the stray capacitances present in the different parts of the circuit and depending on the permittivity of the environment.

Furthermore, one keep at an acceptable value the level of the voltage which is obtained at the terminals of the antenna, which is a source of power for the operating of the chip included in the tag.

One may thus achieve, thanks to such new and inventive arrangement, the reduction of the value of the impedance without requiring the reduction of the number of turns of the planar windings composing the antenna (the inductance varying with the square of the number of turns), or even increasing the size of an antenna which is located on the concave surface of a polymer tube.

In a simplified embodiment, the terminals of the resonant antenna thus formed are directly interconnected. A simple resonator having frequency tuning and quality factor characteristics which are not negatively altered by a moist environment is thus obtained, such a resonator being capable of responding to simple marking applications.

In an embodiment capable of working with an electronic chip, it may be necessary to interpose a matching circuit between the inductive resonant antenna and the electronic chip.

Figure 7:
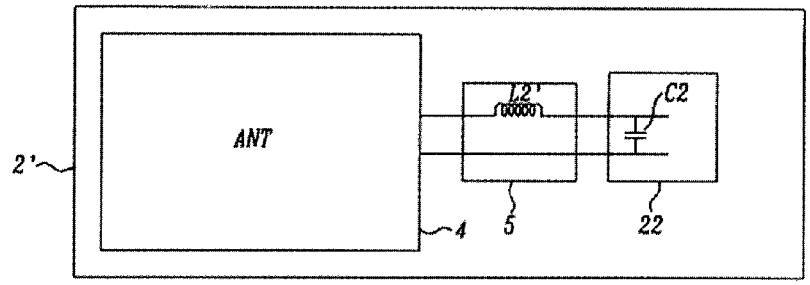
FIG. 7 illustrates the general architecture of a high-frequency inductive antenna which may serve for the realization of a radio-label located on the polymer tube.

FIG. 7 illustrates more particularly the general architecture of an inductive high-frequency antenna which can be sued for the realization of a radio-tage located on a polymer tube dedicated to an underground pipeline.

A resonator 4 (ANT) formed of resonant subassemblies, examples of which will be described hereinafter, is connected to an electronic chip 22 via a matching circuit 5. Such a matching circuit is for example formed of an inductance (for example, a planar inductive winding) in series with the resonator windings. A capacitive element C2 takes part in the matching but may be integrated in chip 22, as shown. Element C2 is in parallel with the electronic circuits of chip 22. Inductance L2' is preferentially of small size as compared with resonant inductive antenna 4. Inductive element L2' is selected so that circuit L2'C2 is tuned to the frequency of the radio frequency field, to obtain an overvoltage effect; Inductive element L2', which does not need to recover a voltage induced by the radio frequency magnetic filed, will preferably be selected to have a small size, whereby the disturbances introduced by the moist environment on the resonance characteristics of circuit L2'C2 only slightly influence the tag operation. In the following description, term "antenna" will designation resonant inductive antenna 4.

Figure 8:
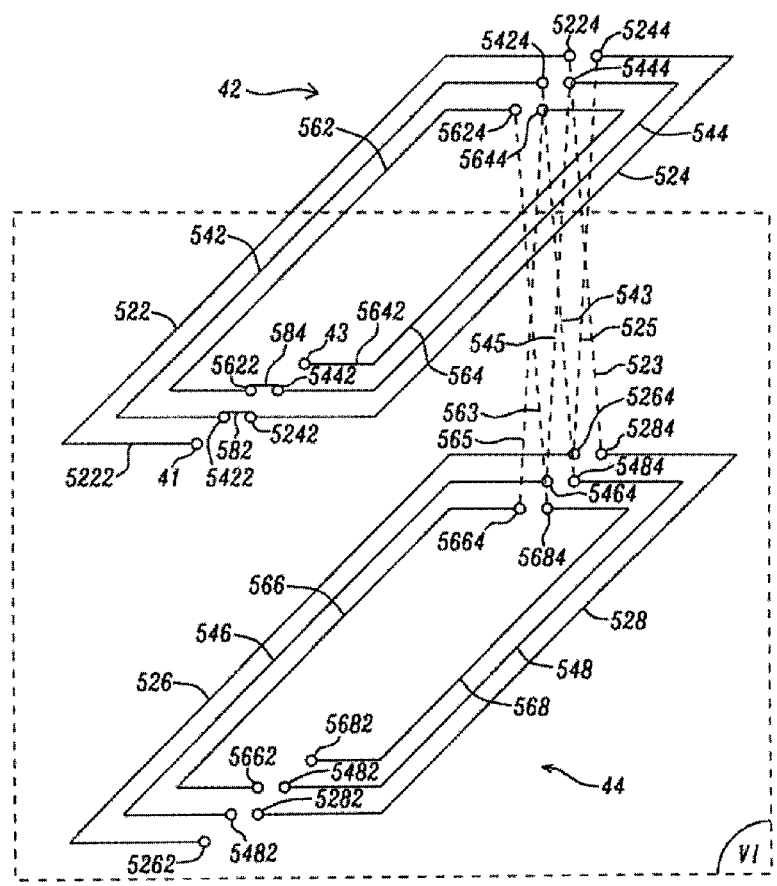
FIG. 8 is a perspective view of an antenna used for radio-tag located on the polymer tube

FIG. 8 is a simplified perspective view of an embodiment of an antenna which can be used for a radio-tag located on a polymer tube.

Figure 9:
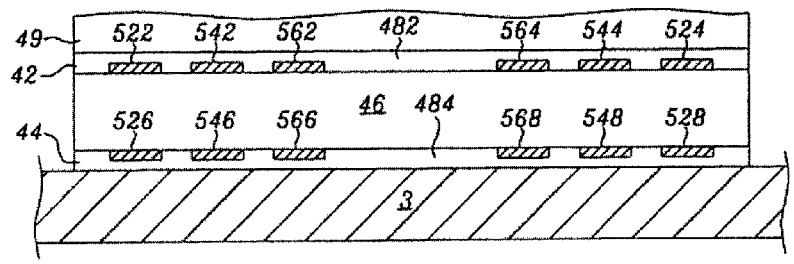
FIG. 9 is a cross-section view along plane V of FIG. 8.

FIG. 9 is a cross-section view along plane V of FIG. 8.

Antenna 4 is formed of two identical planar conductive windings 42 and 44 on the two surfaces of an insulating substrate 46. The windings are placed vertically above each other. The substrate is, for instance, a flexible insulating sheet of the type currently used for planar antennas. The windings are interrupted, preferably at regular intervals, to form on each surface of the substrate an assembly of stacked identical conductive tracks forming micro-strip line sections, such microstrip line sections being contiguously gathered by two according to the layout of the windings forming resonant subassemblies.

In a same resonant subassembly, the conductive tracks of the two line sections are connected to the geometrical point of continuity according to the layout of the windings according to two embodiments which will be discussed hereafter. The resonant subassemblies are interconnected according to the layout of the windings between one end of a first subassembly connected to a terminal 41 of antenna 4 and one end of a last subassembly connected to a terminal 43 of antenna 4. The connections are performed by means of elective connections on a same surface or of through electric connections from one surface to the other (vias).

According to the embodiment of FIG. 8, the antenna is formed of three resonant subassemblies 52, 54, and 56 of two microstrip line sections forming an assembly of four conductive tracks, each subassembly comprising two first tracks 522, 524, 542, 544, 562, 564 on the first surface of the substrate opposite to two second tracks 526, 528, 546, 548, 566, 568 on the second surface. The first microstrip line to sections of each subassembly are respectively formed of track pairs 522 and 526, 542 and 546, 562 and 566, and the second sections are formed of track pairs 524 and 528, 544 and 548, 564 and 568. The two tracks of a same resonant subassembly and of a same surface are geometrically one after the other in the corresponding winding 42 or 44.

Thus, a first terminal 41 of antenna 4 is connected to a first end 5222 of a track 522 (for example, arbitrarily forming a half-loop) having its second end 5224 facing, without being connected thereto, a second end 5244 of a track 524 of a first subassembly 52. Track 524 continues winding 42 and is connected (connection 582), by its first end 5242, to first end 5422 of a track 542 of second subassembly 54. This structure is repeated all along first winding 42. Thus, a first end 5622 of a track 562 of third subassembly 56 is electrically connected (connection 584) to end 5442 of track 544 of subassembly 54. A second end 5624 of track 562 faces (without being connected thereto) second end 5644 of a track 564 of subassembly 56. A first end 5642 of track 564 ends the winding by a connection to a second terminal 43 of the antenna.

On the second surface side, an identical pattern is repeated with second tracks 526, 528, 546, 548, 566, and 568 of subassemblies 52, 54, and 56. The first respective terminals 5262, 5462, 5662, 5282, 5482, and 5682 of tracks 526, 546, 566, 528, 548, and 568 are however left floating.

In the embodiment of FIG. 8, second respective ends 5224, 5424, and 5624 of tracks 522, 542, and 562 of first winding 42 are connected (for example, by vias, respectively 523, 543, and 563) to second respective ends 5284, 5484, and 5684 of tracks 528, 548, and 568 of the corresponding subassembly, formed in second winding 44. Second respective ends 5244, 5444, and 5644 of tracks 524, 544, and 564 of first winding 42 are connected to second respective ends 5264, 5464, and 5664 of tracks 526, 546, and 566 of the corresponding subassembly, formed in second winding 44.

As a variation, connections 582 and 584 are on winding 44 (respectively connecting ends 5462 and 5282 and ends 5662 and 5482) and second ends 5422, 5622, 5242, and 5442 of tracks 542, 524, 562, and 544 are left floating. In this variation, the terminals of the antenna then correspond to ends 5262 and 5682 of tracks 526 and 568.

Both surfaces are covered with an insulating varnish 482, 484 (FIG. 6), after an electronic circuit (chip 22) has been arranged thereon, possibly with an interposed matching circuit 5. The assembly can then be arranged (for example glued) on the external surface of pipe 3. Finally, an insulating film 49 is arranged on the assembly.

It can be considered that each resonant track subassembly 52, 54, 56 represents a Moebius-type connection between two line sections (see, for example, article "*Analysis of the Moebius Loop Magnetic Field Sensor*" by P. H. Duncan, published in IEEE Transaction on Electromagnetic Compatibility, May 1974 which describes a Moebius-type connection with two coaxial line sections). The different resonant subassemblies are then geometrically arranged end to end in an involute shape, the electric connection between two adjacent subassemblies being preferably performed in a single conductive level. There is no electric continuity via a same subassembly between the two electric connections which connect this subassembly to the adjacent subassemblies or to terminals 41, 43 of antenna 4.

Figure 10A:
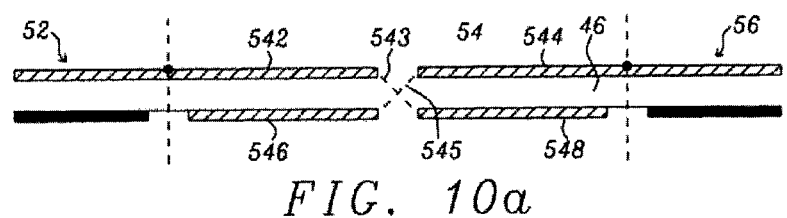
FIG. 10a is a simplified cross-section view of a first type of subassembly of an antenna which is adapted for carrying out a radio-tag for a polymer tube.

FIG. 10*a* is a cross-section view of a first type of subassemblies of an antenna which can be used for realizing a radio-tag for a polymer tube.

Figure 10B:
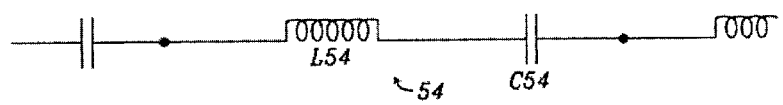
FIG. 10b shows the equivalent electric diagram of the subassembly of FIG. 10.

FIG. 10*b* shows the equivalent electric diagram of subassembly of FIG. 10*a*.

Each first track 542 or 544 formed in the first conductive level or winding is connected, by its second end and by connection 543, respectively 545, to second track 548 or 546 vertically above the other first track in the other level or winding (crossed connection). The first ends of tracks 542 and 544 define terminals of access to the subassembly, respectively connected to the access terminals of adjacent subassemblies 52 and 56. The first ends of tracks 546 and 548 are left floating.

From an electric viewpoint and as illustrated in FIG. 10*b*, the equivalent electric diagram of such a subassembly amounts to electrically arranging, in series, an inductance of value L54 and a capacitor of value C54. Inductance L54 represents the inductance of a single conductive track equivalent to the association of the conductive tracks of subassembly 54, plus the mutual inductances between this equivalent track and the equivalent tracks associated in the same way with the other subassemblies. Capacitor C54 represents the capacitance formed by the tracks of subassembly 54 between tracks 542 and 544 of the first level and tracks 546 and 548 of the second level (taking into account the electric permittivity of insulating substrate 46). The different resonant circuits are electrically seriesconnected to form the antenna.

Figure 11A:
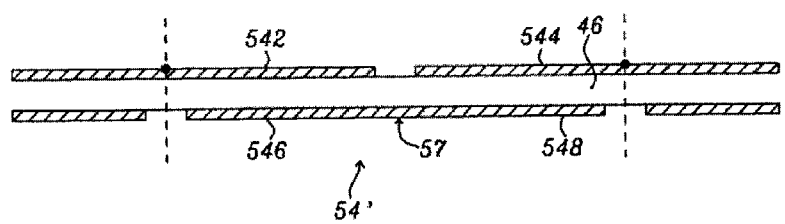
FIG. 11a is a simplified cross-section view of a second type of subassembly of an antenna adapted for realizing a radio-label for a polymer tube.

The impedance of resonant subassembly 54 is, in this embodiment (neglecting ohmic losses in the conductive tracks and dielectric losses), $Z = jL54\omega + 1/jC54\omega$ FIG. 11*a* is a cross-section view of a subassembly according to a second embodiment.

According to this second embodiment, the second respective ends of tracks 542 and 544 of the first winding are left floating (unconnected) and the second respective ends of tracks 546 and 548 of the second winding of a same subassembly are interconnected (connection 57). The rest is not modified with respect to the first embodiment.

Figure 11B:
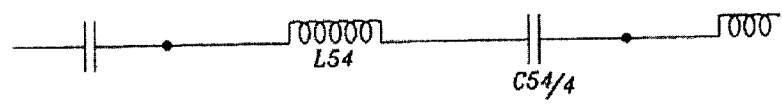
FIG. 11b shows the equivalent electric diagram of the subassembly of FIG. 11a, and FIG. 12a illustrates another embodiment of a radio-label, housed in a standalone unit that can be clamped.

From an electric viewpoint and as illustrated in FIG. 11*b*, assuming that the tracks are of same length in the two embodiments, the embodiment of FIGS. 11*a* and 11*b* amounts to a series connection of an inductive element of value L54 with a capacitive element of value C54/4, where L54 and C54 represent the inductances and capacitances of subassembly 54 defined in relation with FIG. 10*b*.

The impedance of a pair of sections in this embodiment is (neglecting ohmic losses in the conductive tracks and dielectric losses), $Z = jL54\omega + 1/j(C54/4)\omega$.

This embodiment decreases the equivalent capacitance but avoids interconnection vias in each subassembly.

The two above embodiments may be combined.

The specific provided antenna structure enables, for a given tuning frequency, to form inductive subassemblies of small value, and thus associated with capacitances of high values (and thus insensitive to the variation of stray capacitances sensitive to the moist environment).

Advantage is thus taken of the dielectric thickness, which enables to form a non-negligible capacitance (greater than 150 pF).

The lengths will then be adapted to the operating frequency of the antenna so that each subassembly respects the tuning, that is, $LC\Box\omega^2=1$ ($L54C54\omega^2$ for subassembly 54 according to the embodiment of FIG. 10b and $L54C54/4\omega^2$ for subassembly 54 according to the embodiment of FIG. 11b).

It is possible to use an approximate rule to size the antenna. To achieve this, unit inductance L0 is considered to be equal to the inductance of a winding equivalent to the parallel association of two windings 42 and 44 divided by the squared number of turns (the number of turns common to windings 42 and 44). General capacitance C0 is also considered to be equal to the total capacitance comprised between the tracks of the first level and the tracks of the second level, taking into account the electric permittivity of insulating substrate 46. If n resonant subassemblies are regularly distributed per turn of the winding, the approximate rule to be respected is $L0C0(\omega/n)^2=1$ in the first embodiment (FIG. 10a) and $L0(C0/4)(\Box\omega/n)^2=1$ in the second embodiment (FIG. 11a). In the case where the resonant subassemblies take up more than one turn, the number of turns is taken into account. For example, for more than two turns $n=\frac{1}{2}$ will be selected.

The equivalent impedance of antenna 4 can be deduced from a series connection of impedances Z of each subassembly. The voltage recovered by antenna 4, when placed in a magnetic field, may be calculated according to the load connected to the antenna, considering that a voltage source is inserted in series with its equivalent impedance. The value of this voltage source corresponds to the electromotive force which would be induced by the radio frequency magnetic field in a winding equivalent to the parallel association of windings 42 and 44.

It can be seen that the lengths of the conductive elements and the capacitive values can thus be varied according to the distribution of the subassemblies of one or the other of the embodiments. The values of the capacitive elements are now no longer negligible and the antenna is less sensitive to disturbances due to its environment.

This way of forming an antenna further enables to split the electric circuit and avoids inductive elements having too long a length where the current would not be able to circulate in homogeneous fashion (amplitude and phase). Indeed, the interconnection of the pairs amounts to series-connecting several resonant circuits of same resonance frequency. The lower the values of the circuit inductances, the lower current drifts by stray capacitance effects will be.

The different subassemblies do not necessarily have the same length, provided for each subassembly to respect the resonance relation, possibly with an interposed capacitor.

Capacitors may be interposed between different subassemblies. However, to avoid adversely affecting the thickness, it will be preferred to vary the thickness of substrate 46.

In the embodiment illustrated in FIG. 8, the used thicknesses preferably have the following orders of magnitude:

substrate 46: less than 200 µm;

conductive layers for forming windings 42 and 44: less than 50 µm, for example, 35 µm;

varnish 482 and 484: on the order of a few tens of µm;

film 49: at most a few hundreds of µm, preferably less than 100 µm.

to Such thicknesses may vary, but it can be seen that the formed transponder is particularly thin (of a thickness smaller than 1 mm in the preferred embodiment) while being insensitive to variations of the stray capacitances due to the presence of the moist environment.

Figure 5:
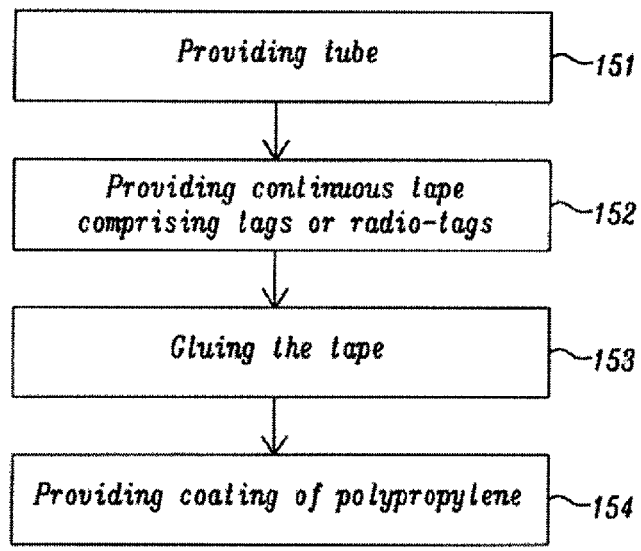

As a specific embodiment, an antenna such as illustrated in FIG. 5 and adapted to an operation at a 13.56-MHz frequency has been formed on a substrate having a 100-µm thickness with a 42.5-pF/cm2 capacitance, in the form of five rectangular loops on each surface of the substrate with the following characteristics (neglecting length variations between subassemblies):

loop size: approximately 210 mm per 50 mm;

width of the copper tracks arranged on the substrate (1.82 mm);

inductance L0=300 nH;

capacitance C0=1,850 pF, that is C54=185 pF in the first embodiment and C54=370 pF (C54/4=93 pF) in the second embodiment.

The practical forming of the antenna, and thus of the transponder, is within the abilities of those skilled in the art based on the functional indications provided hereabove and by using manufacturing techniques current in the manufacturing of integrated circuits on a thin flexible support. In particular, the forming of the interconnects between levels in the embodiment of FIGS. 5 and 7 may require offsetting the respective ends of the tracks in each of the windings.

The manufacturing processes which were described above can be used for producing a polymer tube comprising, inside it, a set of radio-tags.

Figure 12A:
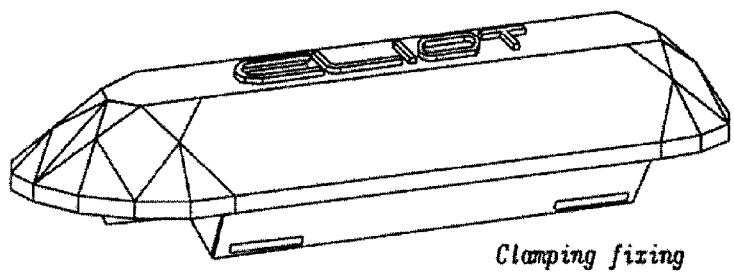
FIG. 12b shows another embodiment of a radio-label, housed in a standalone unit that can be fixed by welding.
FIG. 12c shows another embodiment of a radio-label, housed in a standalone unit that can be fixed by clipping.
Figure 12B:
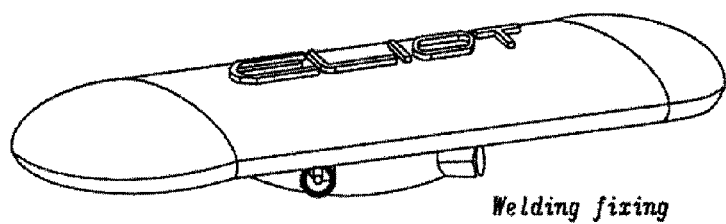
Figure 12C:
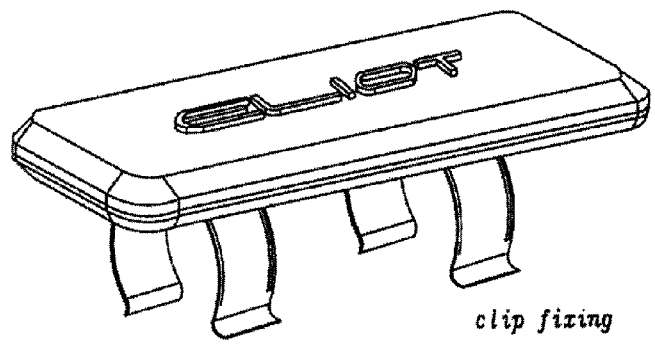

One may however consider another embodiment wherein the radio tag is located within a package which can be clamped, screwed, glued or welded as this is illustrated in FIGS. 12a to 12c.

Advantage of the Polymer Tube Incorporating the Radio Tag

In the gas sector, where the polyethylene is already widely present for reasons of reliability, the invention provides an adequate response to a persistent demand of gas distributors: localization and traceability from the surface and for obvious reasons of improving the safety of underground networks.

The invention thus provides a major advantage for polymer pipes buried underground, since those pipes can firstly be localized and secondly can communicate. These pipelines achieves the possibility to exchange information such as identity, characteristics and localization which becomes available from the surface. Traceability is greatly enhanced.

The capacity to detect a pipe: provides security for the operators. The issue of positioning—in situ—polymer pipes is a significant cause of gas explosions.

Traceability allow easy updating of maps Possible additional information allowing smart pipes.

The invention claimed is:

1. A polymer tube for detecting a pipe buried underground, said tube comprising:

the polymer tube;

a plurality of radio-tags arranged at regular intervals along the tube; and a protective layer of said tags;

wherein each of said radio-tags comprise a resonant circuit split into interconnected subassemblies of low inductance, so that the resulting resonant circuit has an increased capacitive value being less sensitive to the stray capacitances present depending of the permittivity of the environment, in particular in a moist environment.

2. The polymer tube according to claim 1 wherein said radio-tags are situated on a ribbon wrapped around the tube.

3. The Polymer tube according to claim 1 wherein said radio-tags are located on a sheet of polymer before welding its ends to the tube.

4. The polymer tube according to claim 1 wherein said radio-tags are located on a continuous tape glued on one generatrix of the tube.

5. The polymer tube according to claim 1 wherein said radio-tags are directly glued after pre-forming.

6. The polymer tube according to claim 1, further comprising a protective polymer layer protecting said radio-tags during bending and packaging of the tube and the operations involved before and during installation.

7. The polymer tube according to claim 1, comprising communication means for communicating identity, characteristics relevant to the manufacturing process of the tube and the localization of the tube.

8. The polymer tube according to claim 7 wherein it is adapted to the realization of a water distribution pipeline (e.g. drinking water) or gas, or for protecting an electric wire or optical fiber.

9. A method of manufacturing a tube of polymer dedicated for an underground pipeline, said method comprising the steps:
providing a polymer tube;
providing a ribbon comprising a series of RFID (Radio Frequency ID) tags, each having a longitudinal axis at an angle α relative to the axis of said tape;
winding said tape around the polymer tube at an angle equal to said angle α so as to align the longitudinal axes of the RFID tags with the axis of the tube;
covering with a protective layer;
wherein each of said RFID tags comprise a resonant circuit split into interconnected subassemblies of low inductance, so that the resulting resonant circuit has an increased capacitive value being less sensitive to the stray capacitances present depending of the permittivity of the environment, in particular in a moist environment.

10. The method according to claim 9, wherein said protective layer is made of polymer material.

11. The method according to claim 9, wherein said RFID tags comprises means for communicating identity, characteristics of the manufacturing process and localization data of the tube.

12. A method of manufacturing a tube of polymer dedicated for an underground pipeline, said method comprising the steps:
providing a polymer tube;
providing a polymer sheet comprising, at regular intervals, radio-tags;
covering the tube with said polymer sheet so as to align ends of said polymer sheet;
welding the ends;
optional covering with a layer of protection;
wherein each of said radio-tags comprise a resonant circuit split into interconnected subassemblies of low inductance, so that the resulting resonant circuit has an increased capacitive value being less sensitive to the stray capacitances present depending of the permittivity of the environment, in particular in a moist environment.

13. The method according to claim 12, wherein said layer of protection is made of polymer material.

14. The method according to claim 12, wherein said radio-tags comprises means for communicating identity, characteristics of the manufacturing process and localization data of the tube.

15. A method of manufacturing a tube of polymer dedicated for an underground pipeline, said method comprising the steps:
providing a polymer tube;
providing a continuous strip having, at regular intervals, RFID (Radio Frequency ID) tags;
bonding of the strip;
covering with a protective layer;
wherein each of said RFID tags comprise a resonant circuit split into interconnected subassemblies of low inductance, so that the resulting resonant circuit has an increased capacitive value being less sensitive to the stray capacitances present depending of the permittivity of the environment, in particular in a moist environment.

16. The method according to claim 15, wherein said protective layer is made of polymer material.

17. The method according to claim 15, wherein said RFID tags comprises means for communicating identity, characteristics of the manufacturing process and localization data of the tube.

18. A method of manufacturing a tube of polymer dedicated for an underground pipeline, said method comprising the steps:
providing a polymer tube;
preforming a radio-label so that its shape coincides with the radius of curvature of the tube;
direct gluing on a generatrix of the tube;
covering with a protective layer;
wherein said radio-label comprises a resonant circuit split into interconnected subassemblies of low inductance, so that the resulting resonant circuit has an increased capacitive value being less sensitive to the stray capacitances present depending of the permittivity of the environment, in particular in a moist environment.

19. The method according to claim 18, wherein said protective layer is made of polymer material.

20. The method according to claim 18, wherein said radio-label comprises means for communicating identity, characteristics of the manufacturing process and localization data of the tube.

21. The polymer tube according to claim 1 wherein said radio-tags are located within a separate package which can be clamped, screwed, glued or welded on the tube.

* * * * *